United States Patent
Nelson et al.

(10) Patent No.: US 11,596,265 B2
(45) Date of Patent: Mar. 7, 2023

(54) MULTI-ROBOTIC ARM COOKING SYSTEM

(71) Applicant: TAYLOR COMMERCIAL FOODSERVICE, LLC, Rockton, IL (US)

(72) Inventors: Dennis J. Nelson, Rockford, IL (US); James J. Minard, Roscoe, IL (US); Jeffrey L. Sands, Freeport, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 307 days.

(21) Appl. No.: 16/109,008

(22) Filed: Aug. 22, 2018

(65) Prior Publication Data
US 2019/0059645 A1 Feb. 28, 2019

Related U.S. Application Data

(60) Provisional application No. 62/550,296, filed on Aug. 25, 2017.

(51) Int. Cl.
*A47J 37/06* (2006.01)
*A47J 37/04* (2006.01)
(Continued)

(52) U.S. Cl.
CPC ........... *A47J 37/0611* (2013.01); *A47J 27/14* (2013.01); *A47J 37/044* (2013.01); *A47J 37/1228* (2013.01); *B25J 9/0087* (2013.01); *B25J 9/1682* (2013.01); *G06F 3/0487* (2013.01); *G06F 3/04847* (2013.01); *A47J 2202/00* (2013.01)

(58) Field of Classification Search
CPC .... A47J 37/044; A47J 37/045; A47J 37/0857; A47J 37/0611; A47J 37/067; A47J 37/0871; A47J 2037/0617; A47J 27/004; A47J 27/62; A47J 36/00; A47J 36/24; A47J 36/321; A47J 39/00; A47J 39/006; A47J 41/0044; A47J 47/01; A47J 36/36;
(Continued)

(56) References Cited

U.S. PATENT DOCUMENTS

| | | | |
|---|---|---|---|
| 3,646,879 A | 3/1972 | Palmason et al. | |
| 4,922,435 A | 5/1990 | Cahlander et al. | |

(Continued)

FOREIGN PATENT DOCUMENTS

| | | |
|---|---|---|
| CN | 105167567 | 12/2015 |
| CN | 205848504 U | 1/2017 |

(Continued)

OTHER PUBLICATIONS

International Search Report for PCT/US2018/047454, dated Oct. 29, 2018, 3 pp.

(Continued)

*Primary Examiner* — Justin C Dodson
(74) *Attorney, Agent, or Firm* — Barnes & Thornburg LLP

(57) ABSTRACT

A cooking system includes a grill, a first arm assembly and a second arm assembly. An electronic hardware controller is in signal communication with the at least one grill, the first arm assembly and the second arm assembly. The controller operates the first arm assembly to transfer a prepared product to the grill, and operates the second arm assembly to transfer a cooked product from the grill.

11 Claims, 3 Drawing Sheets

(51) Int. Cl.
- *G06F 3/0484* (2022.01)
- *G06F 3/0487* (2013.01)
- *B25J 9/16* (2006.01)
- *B25J 9/00* (2006.01)
- *A47J 27/14* (2006.01)
- *A47J 37/12* (2006.01)
- *G06F 3/04847* (2022.01)

(58) Field of Classification Search
CPC ........ A47G 23/08; A47F 10/06; B25J 9/0087; B25J 9/043
USPC ..... 99/423, 443 C, 349, 386, 355, 427, 339, 99/443 R, 422, 373, 357, 331, 390, 477, 99/326, 372, 399, 404, 447, 391, 392, 99/324, 325, 389, 421 R, 470, 486
See application file for complete search history.

(56) References Cited

U.S. PATENT DOCUMENTS

| | | | |
|---|---|---|---|
| 5,044,264 A * | 9/1991 | Forney | B65G 15/38 |
| | | | 99/349 |
| 5,172,328 A | 12/1992 | Cahlander et al. | |
| 5,188,020 A | 2/1993 | Buchnag | |
| 5,458,051 A | 10/1995 | Alden et al. | |
| 5,791,234 A | 8/1998 | Newton et al. | |
| 5,910,207 A | 6/1999 | Newton et al. | |
| 6,016,743 A | 1/2000 | Glavan | |
| 7,448,373 B2 | 11/2008 | Hill et al. | |
| 7,472,645 B2 | 1/2009 | Hill et al. | |
| 9,861,230 B2 | 1/2018 | Freymiller et al. | |
| 9,927,382 B2 | 3/2018 | Freymiller et al. | |
| 10,010,218 B2 | 7/2018 | Sands et al. | |
| 10,098,499 B2 | 10/2018 | Nelson | |
| 10,117,545 B2 | 11/2018 | Nelson et al. | |
| 10,159,379 B2 | 12/2018 | Nelson | |
| 10,213,050 B2 | 2/2019 | Freymiller et al. | |
| 2005/0193901 A1 | 9/2005 | Buehler | |
| 2005/0229919 A1 | 10/2005 | Sands et al. | |
| 2006/0254430 A1 * | 11/2006 | Nevarez | A47J 37/0611 |
| | | | 99/349 |
| 2006/0257542 A1 | 11/2006 | Cook et al. | |
| 2013/0071534 A1 | 3/2013 | Newton | |
| 2013/0101714 A1 * | 4/2013 | Buehler | A23L 5/10 |
| | | | 99/341 |
| 2014/0216272 A1 | 8/2014 | Kot | |
| 2015/0108110 A1 | 4/2015 | Freymiller et al. | |
| 2015/0305555 A1 * | 10/2015 | Nelson | A47J 37/0611 |
| | | | 99/325 |
| 2015/0305557 A1 * | 10/2015 | Nelson | A47J 37/0611 |
| | | | 99/375 |
| 2016/0037958 A1 * | 2/2016 | Freymiller | A47J 37/0611 |
| | | | 426/233 |
| 2016/0037967 A1 | 2/2016 | Glavan et al. | |
| 2016/0045066 A1 | 2/2016 | Sands et al. | |
| 2016/0045068 A1 * | 2/2016 | Sands | A21B 5/02 |
| | | | 99/325 |
| 2016/0059412 A1 * | 3/2016 | Oleynik | B25J 3/04 |
| | | | 700/257 |
| 2016/0309941 A1 | 10/2016 | Minard | |
| 2017/0065124 A1 * | 3/2017 | Colston | A47J 37/0704 |
| 2017/0099986 A1 | 4/2017 | Patel et al. | |
| 2017/0290345 A1 * | 10/2017 | Garden | B25J 9/0093 |
| 2018/0360269 A1 | 12/2018 | Sands et al. | |
| 2019/0038073 A1 | 2/2019 | Nelson | |
| 2019/0045972 A1 | 2/2019 | Freymiller et al. | |
| 2019/0057344 A1 | 2/2019 | Minard | |
| 2019/0059399 A1 | 2/2019 | Meinert et al. | |
| 2019/0059641 A1 | 2/2019 | Minard et al. | |
| 2019/0059643 A1 | 2/2019 | Minard et al. | |
| 2019/0059644 A1 | 2/2019 | Nelson et al. | |
| 2019/0059645 A1 | 2/2019 | Nelson et al. | |
| 2019/0062052 A1 | 2/2019 | Sands et al. | |
| 2019/0075966 A1 | 3/2019 | Kelly | |
| 2019/0104883 A1 | 4/2019 | Nelson | |
| 2019/0104885 A1 | 4/2019 | Pahnke et al. | |
| 2019/0117019 A1 | 4/2019 | Minard | |

FOREIGN PATENT DOCUMENTS

| | | |
|---|---|---|
| FR | 2483206 A | 12/1981 |
| WO | 91/12597 | 8/1991 |
| WO | 03/092407 A1 | 11/2003 |
| WO | 2013/092407 A1 | 6/2013 |
| WO | WO 2017/177041 A2 | 10/2017 |

OTHER PUBLICATIONS

Written Opinion for PCT/US2018/047454, dated Oct. 29, 2018, 6 pp.

International Preliminary Report on Patentability for International Application No. PCT/US2018/047454.

Examination Report for corresponding International Application No. EP18762985.2 dated Aug. 6, 2021, 6 pgs.

English translation of Office Action issued in Appl. No. CN201880055149 (dated Aug. 4, 2022).

* cited by examiner

MULTI-ROBOTIC ARM COOKING SYSTEM

CROSS-REFERENCE TO RELATED APPLICATION

The present patent document claims the benefit of the filing date under 35 U.S.C. § 119(e) of U.S. Provisional Application No. 62/550,296, filed Aug. 25, 2017, which is hereby incorporated by reference.

BACKGROUND

Exemplary embodiments pertain to the art of restaurants and food preparation and, more particularly, to handling of pre-cooked and cooked food products.

Cooking meat, vegan, vegetarian, and/or seafood products is often labor intensive and requires a human server to transfer, handle and/or interact with the food product throughout the cooking process. Variations in cooking expertise and style may often lead to differences in uniformity of the final product (i.e. the cooked product). In addition, several different kitchen utensils may be used during the product handling and cooking process, which can cause interaction between pre-cooked foods and cooked foods.

BRIEF DESCRIPTION

Disclosed is a cooking system includes a grill, a first arm assembly and a second arm assembly. An electronic hardware controller is in signal communication with the at least one grill, the first arm assembly and the second arm assembly. The controller operates the first arm assembly to transfer a prepared product to the grill, and operates the second arm assembly to transfer a cooked product from the grill.

Also disclosed is a method of handling food products to be cooked by a cooking system. The method comprises heating a grilling surface included with at least one grill to a cooking temperature. The method further comprises outputting a first position signal, via an electronic hardware controller, to move a first arm assembly along a track and to transfer a prepared product to the grilling surface. The method further comprises outputting a second position signal, via the controller, to move a second arm assembly along the track with respect to the first arm assembly to transfer a cooked product from the heating grilling surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
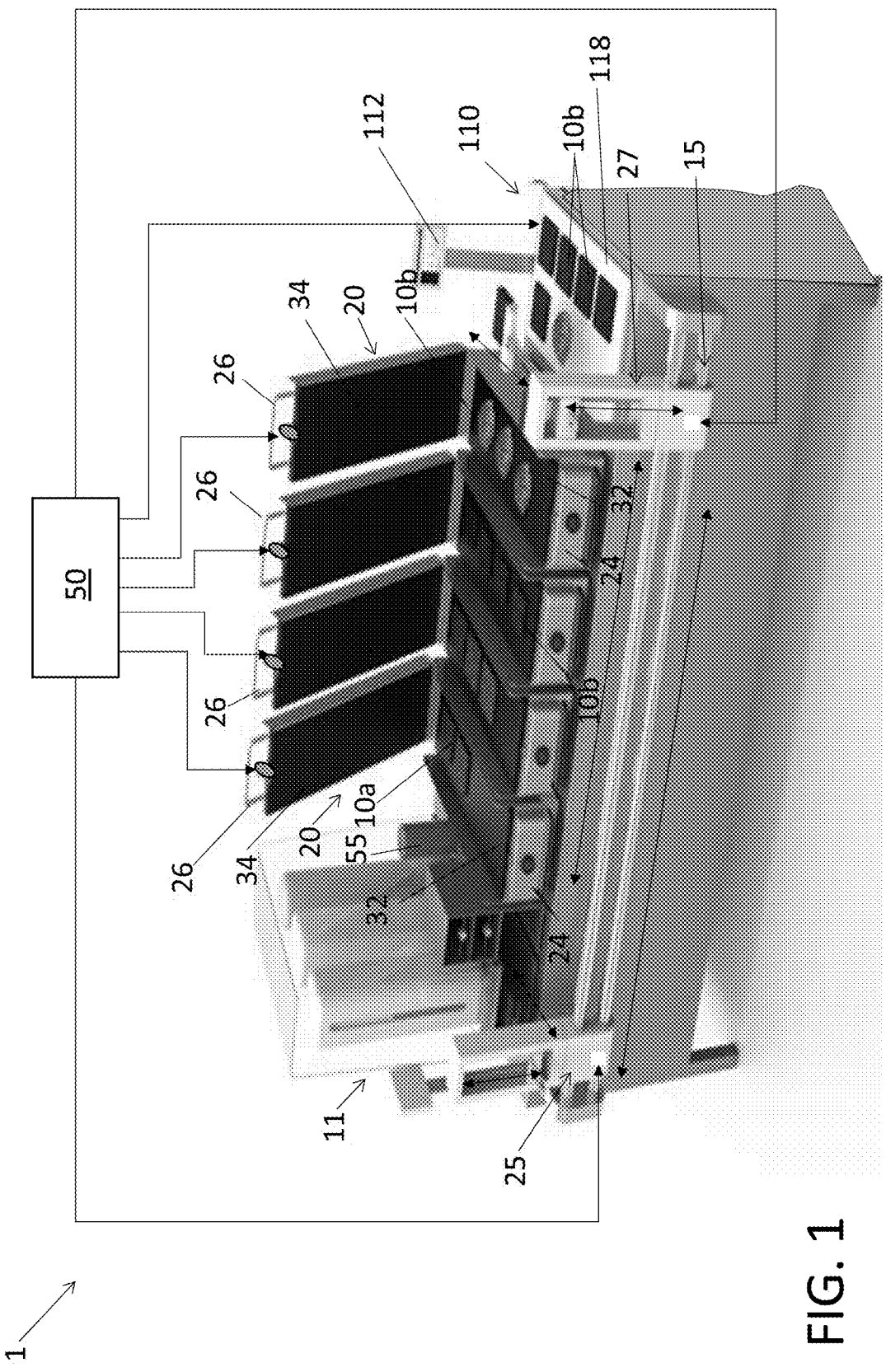
FIG. 1 illustrates a multi-robotic arm cooking system according to a non-limiting embodiment.

With reference now to FIG. 1, a multi-robotic arm cooking system 1 is illustrated according to a non-limiting embodiment. The multi-robotic arm cooking system 1 includes, one or more grills 20, a first robotic arm assembly 25, a second robotic arm assembly 27, and an electronic hardware controller 50. The multi-robotic arm cooking system 1 utilizes the first and second robotic arm assemblies 25 and 27 to automatically load prepared products 10*a* to one or more grills and unload cooked products 10*b* from the grills 20. Although the prepared products 10*a* will be referred to as raw food products going forward, the prepared products 10*a* are not limited thereto. For example, the prepared products 10*a* may include various food products including, but not limited to, raw meat patties (e.g., hamburger), raw poultry, bean patties, potatoes cakes, and fish products. Although four grills 20 are shown, more or less grills can be implemented. The multi-robotic arm cooking system 1 can also utilize a robotic arm to automatically clean one or more of the grills 20 between cooking sessions as described in greater detail below.

The grills 20 include a lower platen assembly 24 (i.e., base portion) that supports a lower grilling plate 32, and the upper platen assembly 26 (i.e., lid portion) that supports an upper grilling plate 34. The lower grilling plate 32 is configured to provide heat to the lower side (i.e., the side closes to the lower platen assembly 24) of each of the selected number of raw products 10*a*. The upper grilling plate 34 is configured to provide heat to an upper side (i.e., the side closest to the upper platen assembly) of each raw product 10*a*.

In at least one embodiment, the lower and upper grilling plates 32 and 34 are formed with rectangular surfaces. The length of the surfaces extends from a front portion of the grill 20 to a rear portion of the grill 20. Although the upper platen 26 is illustrated as being pivotably coupled to the rear portion of the grill 20, the assembly of the upper platen 26 is not limited thereto. The width of each grill 20 extends between two opposing sides. In this manner, the lower grilling plate 32 can support multiple prepared food raw 10*a* to perform batch cooking. The front portion and/or the sides can include a waste bin (not shown) that captures loose food products following the scraping and cleaning of the upper and lower grilling surfaces 34 and 36.

The upper and lower grilling plates 32, 34 are heated by a heater (not shown) to cook a selected number of prepared raw 10*a*. In order to transmit heat to the products 10*a*/10*b*, the lower and upper grilling plates 32, 34, respectively, may be formed of a heat-conducting material, such as cast aluminum, abrasion-resistant steel, cast iron, stainless steel, mild steel, a ceramic material, or other suitable heat conducting materials used in grills.

The upper platen assembly 26 may be automatically moved (e.g., via one or more actuators or motors that are operated by the controller 50) between a cooking position (e.g., moved in close proximity to the lower platen assembly 24) and a non-cooking position (e.g., moved away from the lower plate assembly 24). The upper platen assembly 26 can also be moved to various intermediate positions between the cooking position and the non-cooking position. When in the cooking position, a heating surface of the lower grilling plate 32 transfers heat to the lower sides of the selected number of raw products 10*a* placed thereon. The upper grilling plate 34 is in close proximity, or in some embodiments contacts, the opposing upper side of the raw products 10*a* so as to transfer heat thereto.

In at least one embodiment, the multi-robotic arm cooking system 1 also includes a grill staging system 110. The grill staging system 110 can serve as a buffer unit or area where the cooked products 10*b* are deposited and held for a predetermined amount of time while awaiting use or before being discarded. In at least one embodiment, the grill staging system 110 includes a holding surface 118 having a heated surface. In this manner, a cooked product 10*b* can maintain a heated temperature until it is ready to be served.

In at least one embodiment, the grill staging system 110 includes a graphical user interface (GUI) 112 to provide various image data. In this manner, the GUI 112 can display various visual indications of the operations of the grill staging system 110. The indications include, but are not limited to, current food orders, cooking times, grilling temperatures, internal food temperatures, etc.

The controller 50 is configured to control the operation of the grills 20, the first and second arm assemblies 25 and 27, and the grill staging system 110. The controller 50 may include a processor and memory. The processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in or operably connected to the path determination system including executable instructions stored therein, for instance, as firmware.

The controller 50 can be in signal communication with one or more actuators or motors to control movement of the upper platen assemblies 26, and first arm assembly, and the second arm assembly 27. The controller 50 can also operate actuators for controlling the movement of a cleaning arm assembly if installed on the multi-robotic arm cooking system 1. The controller 50 can also control cooking temperatures of the grills 20 and heating temperatures of the staging area 110.

The controller 50 can further comprise a communications adapter, and a display interface. The communications adapter may be a small computer system interface (SCSI) adapter that communicates with a hard disk and/or any other similar component. The communications adapter can establish data communication with a network, which may be an outside network, enabling the cooking system 1 to communicate with other systems.

The display interface exchanges image data and control inputs between the controller 50 and the GUI 112. In this manner, the GUI 112 can display various visual indications of the operations of the grill staging system 110, while also exchanging input commands such as heating temperature settings, etc., with the controller 50.

One or more actuators (not shown) can be operated by the controller 50 to control various movements of the grills 20 and/or arms 25 and 27. One or more sensors (not shown) can be provided to monitor each of the plurality of actuators and detect a selected distance D1 between lower grilling plate 32 and the upper grilling plate 34, temperatures of the grilling plates 32 and 34, temperature of the holding surface 118, positions of the arm assemblies 25 and 27 on the track 15. In one embodiment, the sensors are Hall Effect sensors or encoders configured to monitor the position of a movable portion upper platen assembly 26. Alternatively, other types of sensors, such as sensors configured to monitor current, load, or another characteristic of the plurality of actuators for example, is also within the scope of the disclosure.

The actuators may also be configured to force the one or all of the grilling plates 32, 34 against the raw products 10*a* to apply a compressed force as the food products 10*a*/10*b* are cooked by a respective grill 20. A motor resistance of the actuators, for example, can be monitored to determine the compression force applied to the raw product 10*a*. For example, the greater the motor resistance, the greater the compression. Once a maximum resistance is detected, the controller 50 can determined that maximum compression is applied, or that the lower grilling plate 32 and upper grilling plate 34 are in contact with one another.

The controller 50 can also automatically calibrate the grill 20 to ensure that the selected distance D1 between the lower grilling plate 32 and the upper grilling plate 34 is maintained at a desired size. By calibrated, it is meant that the upper grilling plate 34 and the lower grilling plate 32 are level to one another to ensure proper cooking of food items.

The first and second robotic arm assemblies 25 and 27 automatically load and unload food products 10*a* and 10*b* to and from one or more grills 20. In at least one embodiment, the first and second robotic arm assemblies 25 and 27 move along a track 15, and each include multiple movable axis points that allow for multiple movements and motions to load and unload food products to and from the grills 20. Although a single track 15 is shown, it should be appreciated that each arm assembly 25 and 27 implemented in the multi-robotic arm cooking system 1 (e.g., the first and second arm assemblies 25 and 27) can be installed on its own individual track.

The first and second arm assemblies 25 and 27 operate in response to commands output by controller 50. A combination of sensors and software logic allows the controller 50 to determine the positions of the first and second arm assemblies 25 and 27 on the track. In this manner, the controller 50 can maneuver the first and second arm assemblies 25 and 27 to automatically load and unload the food products 10*a* and 10*b* while preventing accidental or undesired collisions.

Figure 2:
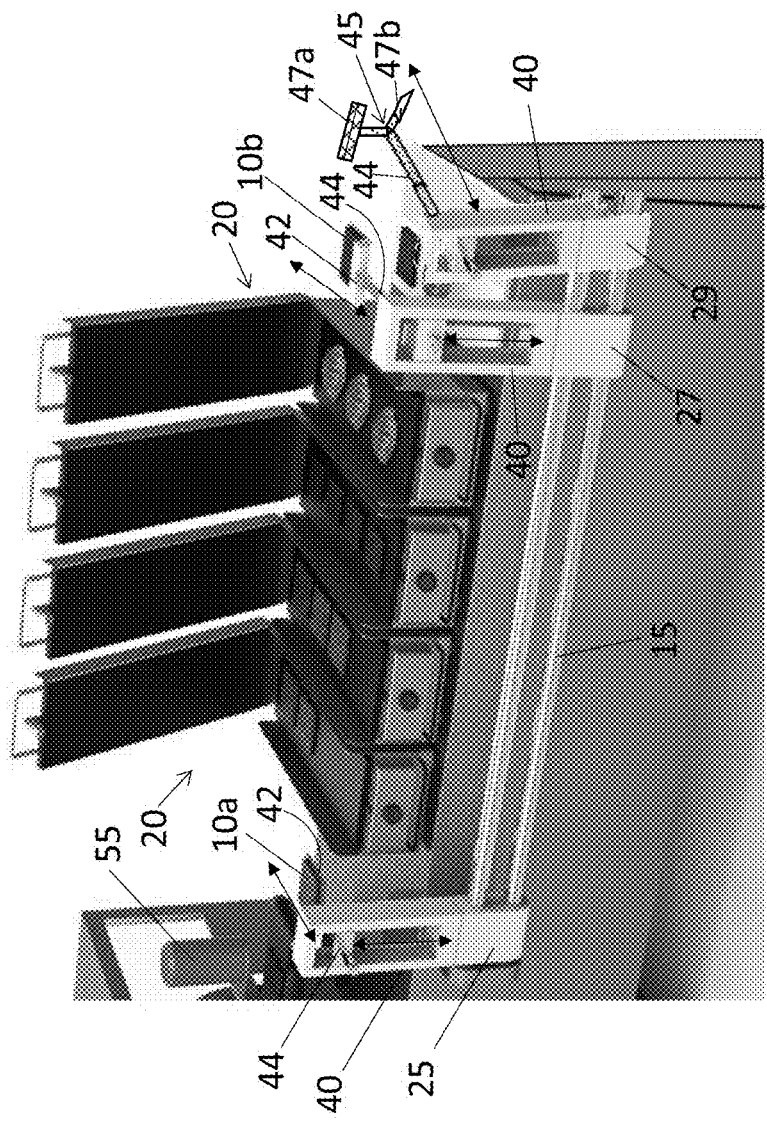
FIG. 2 is illustrates a multi-robotic arm cooking system according to another non-limiting embodiment.

Referring to FIG. 2, the first arm assembly 25 is responsible for handling prepared products 10*a* (e.g., raw patties, raw chicken, etc.) to be loaded on a grill 20. The first arm assembly 25 includes a moveable housing 40 and a utensil 42 that is movably attached to the housing via a projecting rod 44. The utensil 42 can include, for example, a spatula 42. The housing can slide laterally along the track 15 so as to be moved into a loading position in front of each grill 20. The rod 44 can be moved in a direction parallel to the length of the grills 20 and also in a vertical direction with respect to the grills 20 so as to locate the utensil 42 with respect to the grill 20. In this manner, the first arm assembly 25 can load one or more raw products 10*a* onto different surface locations of the lower grilling plate 32. For instance, when an order of four raw products 10*a* is submitted, the first arm assembly 25 can be controlled such that the first raw product 10*a* is placed near the rear of the grill 20, while the fourth raw product 10*a* is placed near the front of the grill 20. In this manner, a batch of raw products 10*a* can be cooked using a single grill 20.

In at least one embodiment, the cooking system 1 includes an automatic seasoning system 55 that works in conjunction with the first arm assembly 25. Prior to loading the product 10*a* onto the cooking area (e.g., the grill 20), the first arm assembly 25 delivers the food product 10*a* to the automatic seasoning system 55. For example, the first arm assembly 25 positions the food product 10*a* beneath the automatic seasoning system 55. The automatic seasoning system 55 then automatically dispenses seasoning (e.g., salt, pepper, spices, etc.) onto the food product 10*a*. Once seasoning is finished, the first arm assembly 25 proceeds to load the seasoned food product 10*a* onto the cooking area (e.g., the grill 20).

The second arm assembly 27 is responsible for handling cooked products 10*b*. In this manner, cross-contamination between prepared products 10*a* (e.g., raw food) and cooked products 10*b* (e.g., products that have completed the grilling process) may be prevented. Similar to the first arm assembly 25, the second arm assembly 27 includes a moveable housing 40 and a utensil 42 that is movably attached to the housing via a projecting rod 44. The housing 40 can slide laterally along the track 15 so as to be moved into a removal position in front of each grill 20. The rod 44 can be moved in a direction parallel to the length of the grills 20 and also in a vertical direction with respect to the grills 20 so as to locate the utensil 42 with respect to the grill 20. In this manner, the second arm assembly 27 can remove cooked products 10b from different surface locations of the lower grilling plate 32.

In at least one embodiment, the multi-robotic arm cooking system 1 includes a third arm assembly 29 which operates in response to commands output by controller 50 (see FIG. 2). The third arm assembly 29 serves as a cleaning arm assembly capable of cleaning one or more of the grills 20. The third arm assembly 29 includes a moveable housing 40 and a cleaning attachment 45 that is movably attached to the housing 40 via a projecting rod 44. The housing 40 can slide laterally along the track 15 so as to be moved into a removal position in front of each grill 20. The rod 44 can be moved in a direction parallel to the length of the grills 20 and also in a vertical direction with respect to the grills 20 so as to locate the cleaning attachment 45 with respect to the grill 20. The length of the track 15 can be increased to accommodate the third arm assembly 29.

The cleaning attachment 45 includes for example, a sponge or squeegee 47a and/or a scraper 47b. When a cleaning operation is invoked, the second arm assembly 27 can be moved so as to prevent obstructed movement of the third arm assembly 29. Thereafter, the third arm assembly 29 can be moved along the track 15 and into a cleaning position located in front of a grill 20. The cleaning attachment 45 can be moved in a direction parallel to the length of the grills 20. In this manner, the cleaning attachment 45 can be moved back and forth (along the length of the grill 20) to scrape loose particles, crumbs, and food product away from the lower grilling plate 32. In at least one embodiment, the upper grilling surface 34 can be lowered onto the cleaning attachment 45 and can be cleaned in a similar manner described above.

Although not illustrated, one of the first and second arm assemblies 25 and 27 can be fitted with the cleaning attachment 45 described above, along with a utensil 42. For instance, the second arm assembly 27 can be fitted with an attachment having a flat upper surface that serves as a spatula, while the opposing lower surface includes a scraper. The rod 44 can be pivoted or rotated about a central axis. In this manner, the spatula can be used to remove the cooked products 10b once the grilling process has completed. After removing the cooked products 10b from the grill 20, the rod 44 can be rotated so that the scraper can be used to clean the lower and upper grilling plates 32 and 34 as described above. In at least one embodiment, an assembly arm 25 and/or 27 can automatically interchange the utensil 42 with a cleaning attachment 45. Thus, the utensil 42 can be automatically interchanged with a cleaning attachment 45, and vice versa.

During operation of the multi-robotic arm cooking system 1, the controller 50 receives a food order from a point of sale (POS) system (e.g., a food ordering system, cashier register, etc.), and invokes operation of the first arm assembly 25. The first arm assembly 25 is first commanded to move into a pick-up position where the utensil 42 is controlled to obtain a raw product 10a from a prep station 11. Once obtained, the controller 50 moves the first arm assembly 25 into a loading position with respect to an available grill 20. The controller 50 is in signal communication with the grills 20, and therefore can determine which grill(s) 20 is available to receive the current order of raw products 10a. Once in the loading position, the first arm assembly 25 is controlled to move the utensil 42 toward an open location on the lower grilling surface 34 where the raw food product 10a is then placed thereon. The first arm assembly 25 may include a vibrating unit that vibrates the utensil 42 to assist in transferring the raw product 10a from the utensil 42 to the lower grilling surface 34.

After the controller 50 determines that the raw products 10a assigned to a given grill 20 have been loaded, the controller 50 automatically lowers the upper platen assembly 26 into the cooking position (e.g., moves the upper platen toward the raw product 10a). In at least one embodiment, the upper grilling 34 is forced against the raw products 10a to apply a compressed force as the raw products 10a are cooked by a respective grill 20. Sensors installed on the grills 20 can output a contact signal in response to detecting physical contact between the lower plate 32 and the upper plate 34. In another embodiment, the controller 50 can monitor a motor resistance of the actuators that move the upper platen assembly 26 assembly into the cooking position, and therefore can determine the compression force applied to the raw product 10a. For example, the greater the motor resistance, the greater the compression. Once a maximum resistance is detected, the controller 50 can determine that maximum compression is applied, or that the lower plate 32 and upper plate 34 are in contact with one another.

The controller 50 can monitor one or more conditions to determine whether the raw products 10a have completed grilling process and can be considered cooked products 10b. In one or more embodiments, the controller 50 monitors temperature of the grill 20, the time at which the raw products 10a are grilled and/or an internal temperature of the food products 10a and/or 10b. Once grilling of each of the selected number of cooked products 10b is complete, the controller 50 automatically moves the upper platen assembly 26 into the non-cooking position (i.e., away from the cooked product 10b), and invokes operations of the second arm assembly 27. For example, the second arm assembly 27 is moved into the removal position in front of the grill 20 containing the finished cooked products 10b. The utensil 42 is then moved in a direction parallel to the length of the grills 20 to remove cooked products 10b from different surface locations of the lower grilling plate 32. Once obtaining the cooked products 10b, the controller 50 can move the second arm assembly 27 to a staging position, where the utensil 42 is operated (via the controller 50) to transfer the cooked products 10b to the holding surface 118.

Figure 3:
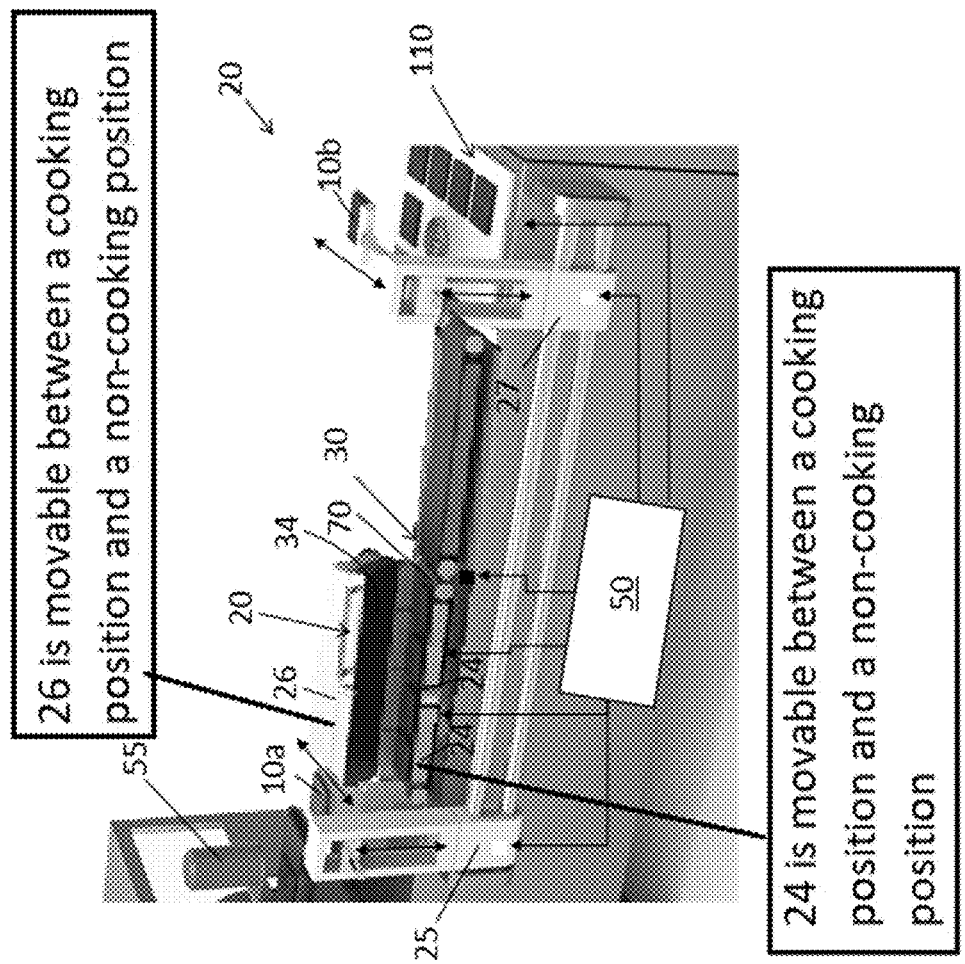
FIG. 3 is illustrates a multi-robotic arm cooking system according to another non-limiting embodiment.

Turning to FIG. 3, a multi-robotic arm cooking system 1 is illustrated according to another non-limiting embodiment. The multi-robotic arm cooking system 1 includes, a first robotic arm assembly 25, a second robotic arm assembly 27, one or more grills 20, and a conveyor system 30. The first and second robotic arm assemblies 25 and 27 operate in conjunction with the conveyor system 30. The conveyor system 30 includes a conveyor belt 70. A portion of the conveyor belt 70 is moveably interposed between a lower platen assembly 24 and an upper platen assembly 26, and is configured to transfer raw products 10a to the grill 20 and cooked products 10b from the grill 20.

As described in detail above. The upper platen assembly 26 and the lower platen assembly 24 may move between a cooking position (e.g., moved in close proximity to the conveyor belt 70) to a non-cooking position (e.g., moved away from the conveyor belt 70). In other embodiments, the lower and/or upper platen assemblies 24 and 26 can be fixed, or can moved to various intermediate positions between the cooking position and the non-cooking position.

The first robotic arm assembly 25 places raw products 10*a* to be grilled (e.g., raw patties, raw chicken, etc.) on the conveyor belt 70. The conveyor belt 70 is configured to move a selected number of raw products 10*a* between the lower grilling plate 32 and the upper grilling plate 34 when the at least one of the upper platen assembly 26 and the lower platen assembly 24 is in the non-cooking position. Although FIG. 3 shows four raw food products 10*a* placed on the conveyor belt 70, more or less raw products 10*a* can be selected by the first robotic arm 25 assembly and placed on the conveyor belt 70.

Similar to the grills 20 described above, the selected number of raw products 10*a* are exposed to a grilling surface when the grill 20 is placed into the cooking position. In this embodiment, the heating surface of the lower grilling plate 32 transfers heat to the selected number of raw products 10 through the conveyor belt. The conveyor belt 70 may be composed of a thermally conductive material such as, for example, steel, relief sheet metal, or a non-stick cooking material. The upper grilling plate 34 is configured to provide heat to an upper side of each of the selected number of raw products 10*a* located on the conveyor belt 70 as described above.

Once the grilling process is completed, the lower platen assembly 24 and/or the upper platen assembly 26 is moved into their non-cooking position, and the secondary arm assembly 27 is moved into the removal position to remove the cooked products 10*b* from the conveyor belt 70. After the cooked products 10*b* have been removed, the conveyor belt 70 passed through and/or past a belt cleaner (not shown) configured to clean the conveyor belt 70. The belt cleaner may include an abrasive material and/or scrapper (not shown) to remove grease and food particles remaining from the cooking process. The belt cleaner may also clean the conveyer belt 70 using a cleaning solution and/or steam which can remove food and sanitize the conveyor belt 70. The cleaner may include high pressure nozzles, moveable brushes, heat or other methods to remove residual food products from the cooking process.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooking system comprising: at least one grill, the at least one grill includes an upper platen assembly installed with an upper grilling plate, and a lower platen assembly installed with a lower grilling plate, the upper platen assembly being pivotable with respect to the lower grilling plate;
   a first arm assembly and a second arm assembly, the first and second arm assemblies configured to move along at least one track; and
   an electronic hardware controller in signal communication with the at least one grill, the first arm assembly and the second arm assembly, the controller configured to control the first arm assembly to transfer a prepared product to the at least one grill, and to control the second arm assembly to transfer a cooked product from the at least one grill,
   further comprising a conveyor system that includes a conveyor belt in heated contact with the at least one grill and disposed between the upper and lower grilling plates, wherein the upper platen assembly and the lower platen assembly each move between a cooking position and a non-cooking position, wherein when in the cooking position the lower grilling plate is in close proximity to but not in contact with the conveyor belt to allow the lower grilling plate to transfer heat to the prepared product disposed upon the conveyor belt by conduction heat transfer through the conveyor belt, wherein when the lower platen assembly is in the non-cooking position the lower platen assembly is spaced away from the conveyor belt such that heat is not transferred to the conveyor belt by conduction heat transfer.

2. The cooking system of claim 1, wherein the first arm assembly includes a first utensil and the second arm assembly includes a second utensil, the first utensil configured to move in a plurality of directions to transfer the prepared product from a preparation station to the grill, and the second utensil configured to move in a plurality of directions to transfer the cooked product from the grill to a staging system.

3. The cooking system of claim 2, wherein the staging system is heated.

4. The cooking system of claim 2, wherein the lower grilling plate extends along a first direction to define a grill length and a second direction to define a grill width.

5. The cooking system of claim 4, wherein the first and second utensils are configured to move in a vertical direction with respect to the lower grilling plate and a lengthwise direction along the at least one track, the lengthwise direction being parallel with respect to a front of the lower grilling plate.

6. The cooking system of claim 5, wherein the controller outputs a command signal that pivots the upper platen into the cooking position that places the upper platen a first distance from the lower platen, and into the non-cooking position that places the upper platen a second distance from the lower platen that is greater than the first distance.

7. The cooking system of claim 1, wherein the controller controls the first arm assembly to transfer the prepared product to the conveyor belt, and to control the second arm assembly to transfer the cooked product from the conveyor belt.

8. A method of handling food products to be cooked by a cooking system, the method comprising:

heating a grilling surface included with at least one grill to a cooking temperature, the grilling surface comprises an upper platen assembly installed with an upper grilling plate and a lower platen assembly installed with a lower grilling plate, the upper platen assembly being pivotable with respect to the lower grilling plate;

moving a thermally conductive conveyor belt over the lower grilling plate and below the upper grilling plate wherein the upper platen assembly and the lower platen assembly each move between a cooking position and a non-cooking position;

moving the lower platen assembly to a non-cooking position;

moving the lower platen assembly to a cooking position, wherein when in the cooking position the lower grilling plate platen assembly is in close proximity to but not in contact with the conveyor belt to allow the lower grilling plate to transfer heat to the prepared product disposed upon the conveyor belt by conduction heat transfer through the conveyor belt, wherein when the lower platen assembly is in the non-cooking position the lower platen assembly is spaced away from the conveyor belt such that heat is not transferred to the conveyor belt by conduction heat transfer;

outputting a first position signal, via an electronic hardware controller, to move a first arm assembly along a track and to transfer a prepared product to the conveyor belt;

outputting a first utensil position signal, via the controller, that moves a first utensil installed on the first arm assembly to transfer the prepared product from a preparation station to the conveyor belt;

loading, via the first arm assembly, the prepared product to the conveyor belt;

transferring the upper platen assembly and the lower platen assembly to the cooking position for a period of time to allow a grilling process upon the prepared product disposed upon the conveyor belt to be completed;

transferring the upper platen assembly and the lower platen assembly to the non-cooking position;

outputting a second position signal, via the controller, to move a second arm assembly along the track with respect to the first arm assembly to transfer a cooked product from the conveyor belt outputting a second utensil position signal, via the controller, that moves a second utensil installed on the second arm assembly to transfer the cooked product from the grilling surface to a staging system further comprising moving the first and second utensils in a vertical direction with respect to the lower grilling plate and a lengthwise direction that is parallel with respect to a grill length so as to transfer the prepared product to the grilling surface and to remove the cooked product from the grilling surface; and removing, via the second arm assembly, the cooked product from the conveyor belt.

9. The method of claim 8, wherein the lower grilling plate extends along a first direction to define the grill length and a second direction to define a grill width, and wherein the first arm assembly is configured to load prepared products at different grilling locations upon the conveyor belt with respect to the lower grilling plate established along the grill length.

10. The method of claim 8, further comprising heating a holding surface of the staging system to reduce a cooling rate of the cooked product.

11. The method of claim 8, wherein the at least one grill includes a plurality of grills.

* * * * *